Inventor
Edwin G. Gettins,
By R. S. Berry
Attorney

Patented June 17, 1952

2,600,752

UNITED STATES PATENT OFFICE 2,600,752

AERATOR

Edwin G. Gettins, Los Angeles, Calif.

Application November 22, 1948, Serial No. 61,395

1 Claim. (Cl. 261—116)

In consideration of the fact that aeration increases the fertility of the soil and promotes plant growth, this invention has for its primary object the provision of a novel and efficient areator which is especially adapted for aerating irrigation water to increase the fertility of the soil for the purpose stated, but may be employed to advantage to aerate liquids which may be benefited by such aeration.

A further object of the invention is to provide an aerator of the character described in which a jet pump means of a novel formation and arrangement is operated by the flow of water through the aerator to intake atmospheric air and saturate the water therewith, in such manner that the water will have a high atmospheric air content.

A further object is to provide an aerator of such described in which the jet pump means for intaking atmospheric air is constructed so it will yield incident to excessive water pressure so as to prevent the imposition of objectional backpressure loads on the pump unit as otherwise might be occasioned by the restriction of flow due to the presence of the jet pump means in the path of the liquid passing through the aerator.

Yet another purpose of this invention is to provide an aerator which is especially constructed to aerate a large volume flow of water as applied for irrigating the soil of citrus orchards and other land supporting plant growth, the aerator being constructed to be mounted on and discharge aerated water into a stand pipe such as usually employed to provide the desired head for irrigation water, or may be arranged to discharge directly into a reservoir or irrigation canal and/or ditches, the richly aerated water produced thereby.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Figure 1:
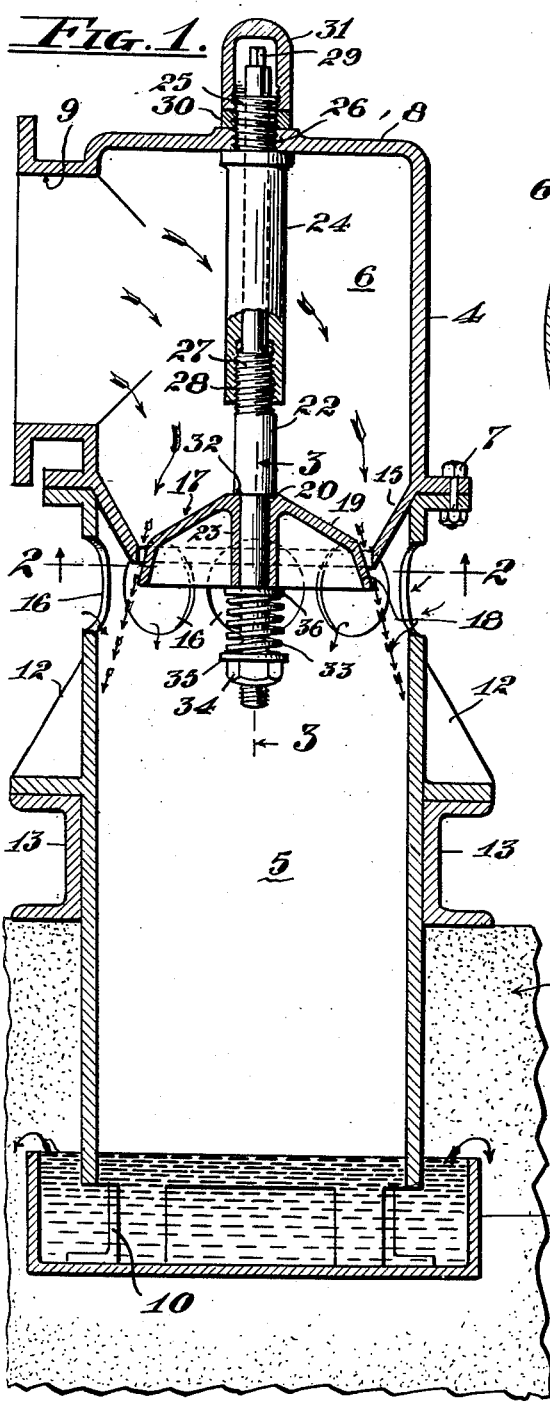
Fig. 1 represents a vertical sectional view of an aerator constructed in accordance with my invention and as installed to discharge aerated water into a reservoir, stand pipe or irrigation ditch.
Figure 2:
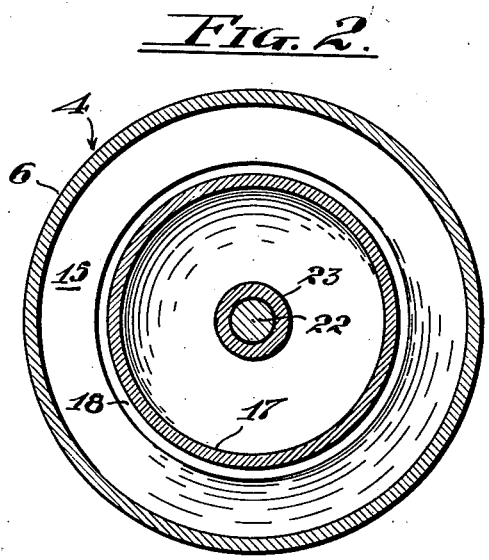
Fig. 2 is a cross sectional view taken on the line 2—2 of Fig. 1.
Figure 3:
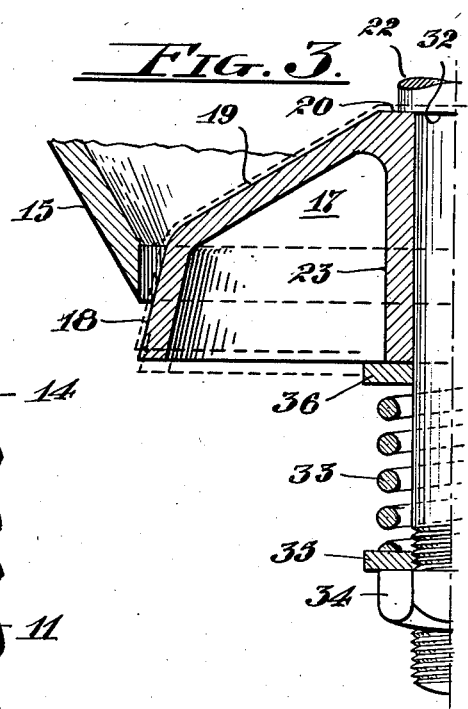
Fig. 3 is an enlarged fragmentary sectional view of part of the jet pump means showing how adjustment may be made to regulate the size of the annular jet orifice.

One embodiment of my invention as shown in the accompanying drawing includes a cylindrical pipe-like body member made up of a lower pipe section 5 and an upper pipe section 6 bolted together as at 7. The upper section has a top wall 8 closing its upper end but is provided with a side intake opening 9 adapted to be connected to an irrigation water supply line (not shown) which leads from a pump (also not shown) for forcing the water through the aerator. The lower end of the lower section 6 is provided with a series of lateral discharge openings 10 which discharge into a water sealing cup 11 welded or otherwise fixed to the lower end of the section 5.

Intermediate of its ends the cylindrical body member is provided with laterally extending feet 12 for supporting the aerator on cross members 13 which may be extended across the top of a stand pipe as indicated at 14. In this connection it should be noted that the aerator may be supported in like manner to discharge into cisterns, reservoirs and irrigation ditches.

In accordance with my invention a jet pump means is provided adjacent the juncture of the two sections 5 and 6 for the purpose of introducing a substantial amount of atmospheric air into the path of the water stream in such manner that said stream will be richly saturated with the air and discharged from the cup 11 as a thoroughly aerated water, whence it may be employed for irrigating and aerating the soil to increase its fertility and promote the growth of plant life.

It is a well established fact that the fertility of the soil for promoting growth of plant life may be effectively increased by aeration, in that the oxygen stimulates the growth of bacteria which converts the nitrogen into nitrates and this with the other components of the air increases the fertility of the soil to the end that plant growth is promoted to an appreciable extent. Accordingly an effective aeration of the soil and the aforesaid beneficial results are achieved with the use of the aerator of this invention.

The jet pump means here shown includes formation of the lower end of the upper pipe section 6 as a frusto-conical nozzle portion 15 which extends downwardly into the upper end of the lower section 5 which latter is provided with a series of air intake openings 16 adjacent the nozzle portion 15. Mounted within the nozzle portion 15 so as to form therewith an annular jet orifice is a circular deflector member 17 of an inverted cup form and provided with a tapered or conical peripherial portion 18 which is opposed to and spaced from the lower end of the nozzle to define the aforesaid annular jet orifice. From the inclined peripherial portion 18 the member 17 is inclined sharply inwardly and upwardly as at 19 to provide an apical portion 20 in which an opening is formed for a reception of a rod 22 for supporting the member 17. A tubular guide member 23 depending from the inner side of the apical portion 20 and integral therewith has its bore in registry with the opening in said apical portion so that the rod 22 may extend therethrough.

The rod is adjustably supported in a sleeve 24 which has a reduced threaded end 25 screwed into an opening 26 in the wall 8. An intermediate portion 27 of the rod 22 is in screw threaded engagement with screw threads 28 in the lower end of the bore of sleeve 24 so that on turning the squared upper end 29 of the rod which extends above the screw threaded end 25, the rod may be readily adjusted to likewise adjust the member 17 for the purpose of varying size of the jet orifice and regulating the operation of the jet pump means. A nut 30 turned on the screw threaded end 25 holds the sleeve 24 in place. A cap 31 is screwed onto the end 25 and provides a suitable covering for the upper end of the rod 22 and may be removed when adjustments are to be made.

The member 17 is supported on the rod 22 so as to yield against excessive water pressure. It is mounted between a shoulder 32 which abuts the apical portion 20 and a spring 33 supported on the rod by a nut 34 and washer 35 on the screw threaded lower end of the rod. The lower end of the guide member 23 abuts a washer 36 which in turn rests on the upper end of the spring 33. The purpose of this mounting is to permit the member 17 to yield downwardly and increase the size of the jet orifice so as to prevent excessive back pressure on the pump unit in the event of an excessive water pressure developed against the member 17.

It should be noted that the angle of the peripherial portion 18 of the deflector member 17 and the extent of said portion below the nozzle 15 are such that the annular jet issuing from the jet orifice will impinge upon the cylindrical wall of the bore of the section 5 in the form of a thin cylindrical film and at a long angle at a point below the air intake openings 16. As a result of this annular jet and the manner in which it is directed against said wall the air induced into the member 5 is prevented from passing through said member without being intimately co-mingled with the jet. The jet acts as a mechanical dam to obstruct the passage of air through the aerator independently of mixture with the water stream and serves to carry the air in close association therewith through the member 5 with a turbulence that causes an effective saturation of the water with the air. By impacting a thin annular jet of water against the cylindrical surface constituting the inner face of the pipe section 5 breaking of the surface tension of the water will be instantly effected with a minimum of rebound so that the film of water will tend to follow the cylindrical inner surface of the section 5 together with the incoming air stream which will likewise tend to follow the cylindrical inner surface of the section 5. In this fashion all the water and air are brought together and immediately intermingled in a thin film such as to effect rapid and thorough saturation or supercharging of the water with atmosphere and whereby a greater amount of oxygen is absorbed into the water than is possible with an inspirator employing a solid jet or jets and particularly where the water is subjected to impact and rebound which tends to effect separation of liquid and gas rather than effecting the retention of gas in the liquid. The air saturated water stream passing through the openings 10 into the sealing cup 11 will overflow from said cup into whatever medium the aerator is arranged to discharge the aerated water. The water contained in the cup 11 acts as a seal to prevent the breaking of the suction or vacuum action of the jet pump means.

In the use of the aerator hereof, the rod 22 is adjusted to set the deflector member 17 in the position desired to create a jet orifice of such size as will produce an effective intaking of atmospheric air in consideration of the pressure and volume of the water pumped into the aerator. The spring 33 may also be regulated as to its force by adjusting the nut 34, in consideration of the maximum water pressure at which the jet pump will function in a normal manner without yielding and opening up the jet orifice on the occasion of an excessive water pressure being developed. This yielding of the deflector member 17 and the consequent wide opening of the jet orifice is desirable to prevent back pressure, which is occasioned when an excessive water pressure is developed, from imposing objectionable or excessive loads on the pump and the electric motor which is usually employed for operating the pumps of irrigation systems. Once the adjustments as aforementioned have been made, it is not necessary to change them for a prolonged operation of the aerator.

It will now be apparent that soil irrigated with the aerator of my invention will be increased as to fertility in a particular advantageous manner as in addition to being aerated, the soil is irrigated at the same time. The aerator may be placed to discharge directly on the ground to be irrigated, or arranged to discharge into a cistern or stand pipe or into an irrigation ditch as desired.

While I have shown and described a specific embodiment of my invention I do not limit myself to the exact details of construction set forth, and the invention embraces such changes, modifications and equivalents of the parts and their formation and arrangement as come within the purview of the appended claim.

I claim:

In an aerator for irrigation water, a hollow body member having upper and lower sections, said lower section having an elongated cylindrical inner surface a downwardly extending frusto-conical nozzle at the juncture of said sections having a convergent margin spaced inwardly from and opening to the cylindrical inside of the lower section, said lower section having side air intake openings leading to the interior thereof and extending contiguous the margin of said nozzle, means for directing water under pressure into the upper section above said nozzle, a circular deflector in the lower end of said nozzle projecting therebeneath provided with a tapered peripherial portion opposed to and spaced from the lower end of said nozzle to define an annular jet orifice, the taper of said peripherial portion being formed long and arranged to direct a thin annular jet of water downwardly and outwardly at a long angle from said nozzle beneath said air intake openings and against the cylindrical inner surface of said lower section, a downwardly extending guide sleeve in said upper section, a rod extending longitudinally through said sleeve from the exterior of said upper section having screw engagement therewith for longitudinal adjustment therein, a guide member on said circular deflector slidably engaging said rod, a shoulder on said rod abutting said reflector and spring means yieldably holding said deflector against said shoulder.

EDWIN G. GETTINS.

REFERENCES CITED

The following references are of record in the file of this patent:

UNITED STATES PATENTS

| Number | Name | Date |
| --- | --- | --- |
| 436,254 | Monnier | Sept. 9, 1890 |
| 934,205 | Nix | Sept. 14, 1909 |
| 1,650,081 | Lindsay | Nov. 22, 1927 |
| 1,923,711 | Decker | Aug. 22, 1933 |
| 1,991,851 | Hammell | Feb. 16, 1935 |
| 2,072,331 | Hanna | Mar. 2, 1937 |
| 2,127,175 | Imbertson et al. | Aug. 16, 1938 |
| 2,134,182 | Goodrie | Oct. 25, 1938 |
| 2,210,846 | Aghnides | Aug. 6, 1940 |
| 2,306,165 | Irish | Dec. 22, 1942 |
| 2,339,640 | Holinger | Jan. 18, 1944 |
| 2,477,204 | Ravine | July 26, 1949 |
| 2,510,395 | Goodrie | June 6, 1950 |